United States Patent
Jeon

(10) Patent No.: US 9,063,272 B2
(45) Date of Patent: Jun. 23, 2015

(54) CAMERA MODULE FOR EASY ADJUSTMENT OF THE FOCAL LENGTH

(71) Applicant: LG INNOTEK CO., LTD., Seoul (KR)

(72) Inventor: Ki Kyung Jeon, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 14/067,518

(22) Filed: Oct. 30, 2013

(65) Prior Publication Data

US 2014/0118609 A1    May 1, 2014

(30) Foreign Application Priority Data

Oct. 30, 2012 (KR) ........................ 10-2012-0121108

(51) Int. Cl.
*G02B 7/04* (2006.01)
*G02B 7/10* (2006.01)
*H04N 5/225* (2006.01)

(52) U.S. Cl.
CPC .. *G02B 7/04* (2013.01); *G02B 7/10* (2013.01); *H04N 5/2254* (2013.01)

(58) Field of Classification Search
CPC . G02B 7/00; G02B 7/02; G02B 7/022–7/023; G02B 7/04; G03B 13/00; G03B 13/18; G03B 13/32; G03B 2213/00; H04N 5/225; H04N 5/2254

USPC ........ 396/72, 79, 144, 90, 529; 348/335–345, 348/374–375

See application file for complete search history.

(56) References Cited

U.S. PATENT DOCUMENTS

| | | | |
|---|---|---|---|
| 6,766,110 B1 * | 7/2004 | Oshima et al. ................. | 396/72 |
| 7,430,368 B2 * | 9/2008 | Lee ................................ | 396/76 |
| 7,469,100 B2 * | 12/2008 | Toor et al. ..................... | 396/144 |
| 7,787,044 B2 * | 8/2010 | Chang ........................... | 348/357 |
| 2003/0137747 A1 * | 7/2003 | Ting .............................. | 359/696 |
| 2005/0190283 A1 * | 9/2005 | Ish-Shalom et al. .......... | 348/340 |
| 2007/0009246 A1 * | 1/2007 | Lee ................................ | 396/72 |
| 2007/0058964 A1 * | 3/2007 | Shangguan et al. .......... | 396/144 |
| 2007/0077051 A1 * | 4/2007 | Toor et al. ..................... | 396/144 |
| 2007/0297785 A1 * | 12/2007 | Kogure et al. ................. | 396/90 |
| 2008/0080072 A1 * | 4/2008 | Chang ........................... | 359/823 |
| 2008/0174690 A1 | 7/2008 | Chang | |
| 2009/0122426 A1 | 5/2009 | Cheng | |
| 2010/0111514 A1 | 5/2010 | Yu et al. | |

* cited by examiner

*Primary Examiner* — Pritham Prabhakher
(74) *Attorney, Agent, or Firm* — Birch, Stewart, Kolasch & Birch, LLP

(57) ABSTRACT

Disclosed is a camera module. The camera module includes a lens barrel including a lens, a lens holder coupled with the lens barrel, and a sensor unit in the lens holder. The lens holder includes a body part including the sensor unit, and a focal length adjusting unit interposed between the lens barrel and the body part to adjust a focal length between the lens and the sensor unit. The focal length of the camera module is easily adjusted without disassembling the camera module.

13 Claims, 6 Drawing Sheets

Fig. 3
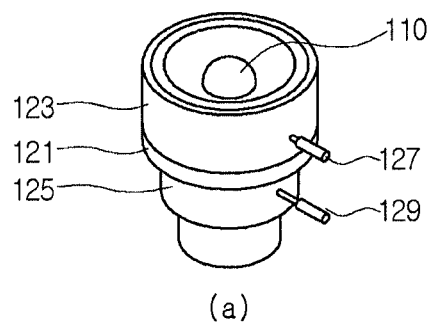
(a)
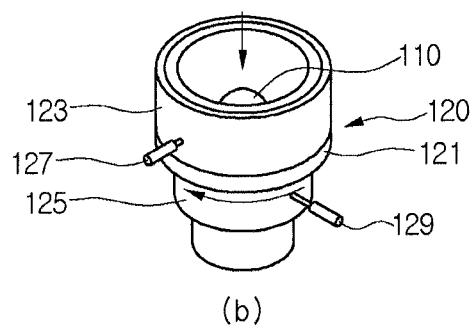
(b)

Fig. 5
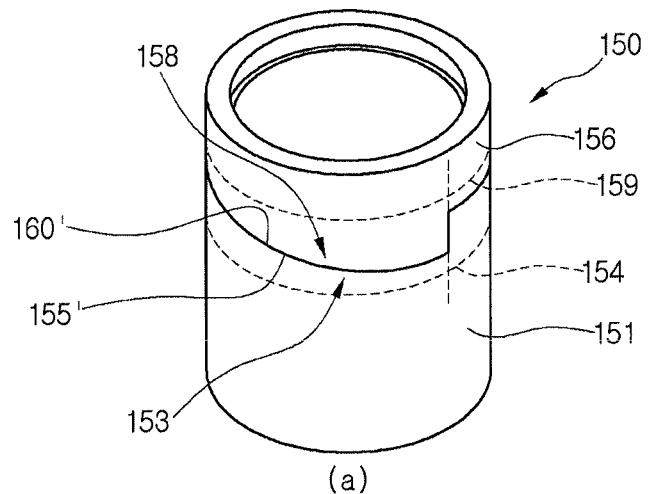
(a)
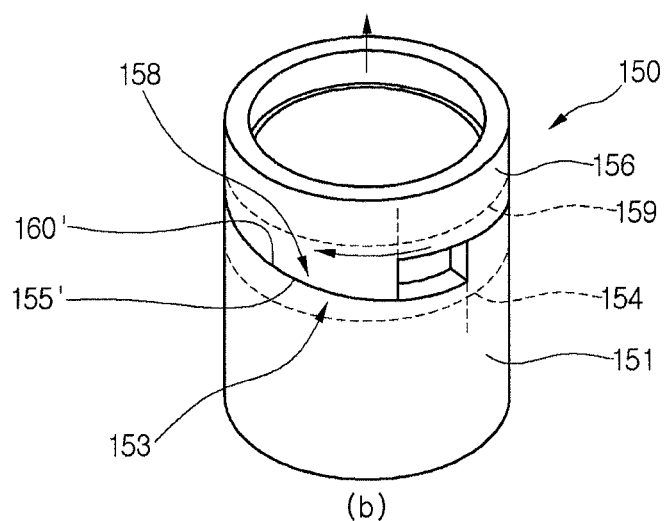
(b)

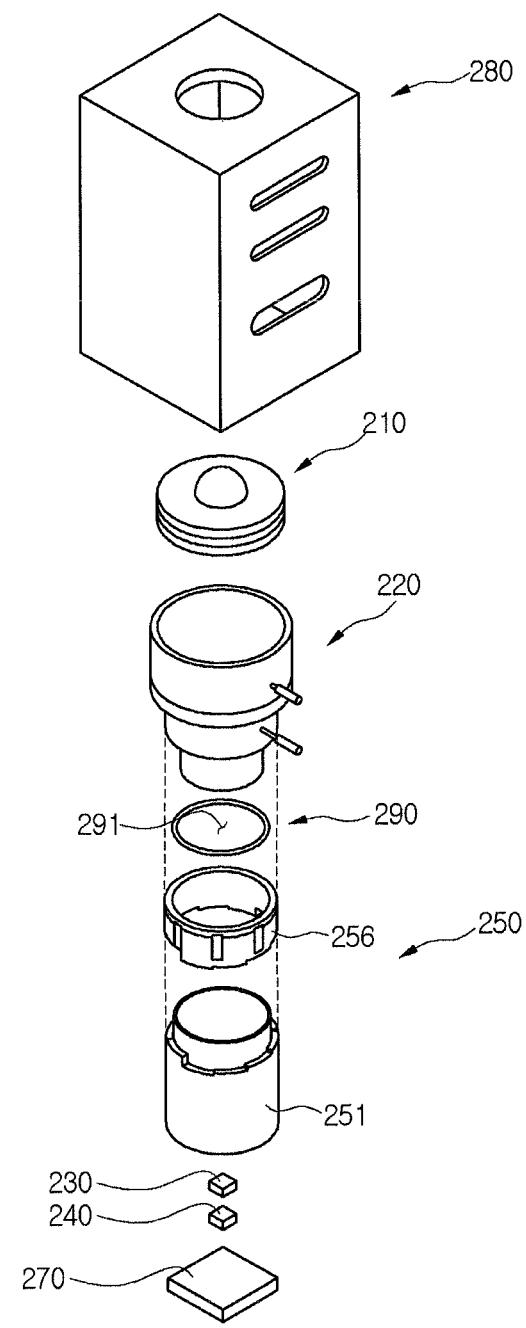

CAMERA MODULE FOR EASY ADJUSTMENT OF THE FOCAL LENGTH

BACKGROUND

The embodiment relates to a camera module.

In general, camera modules are mounted on portable appliances such as mobile communication terminals and MP3 players as well as electronic appliances such as vehicles, endoscopes, and CCTVs. The camera modules are increasingly developed toward small and thin camera modules while focusing on high resolution. In addition, recently, the camera modules are realized with various added functions at low manufacturing cost.

The camera module includes a lens barrel to receive a lens, a lens holder coupled with the lens barrel, and an image sensor provided in the lens holder. In this case, the lens transmits an image signal of a subject to the image sensor. In addition, the image sensor converts the image signal into an electrical signal. The accuracy of the image signal in the camera module is determined depending on a focal length defined as a distance between the lens and the image sensor. However, in the case of a vary focal lens or a lens having a function similar to that of the vary focal lens, errors are caused depending on lens designs. Accordingly, when manufacturing the camera module, the focal length must be accurately set.

However, when manufacturing the above camera module, it is difficult to accurately set the focal length between the lens barrel and the lens holder because the accuracy of the focal length may be determined after the lens barrel has been coupled with the lens holder. Accordingly, the accuracy of the focal length is determined after manufacturing the camera module. If it is determined that the focal length is not accurate, the focal length must be adjusted by disassembling the camera module. The above operations may be repeated several times until the focal length is determined as being accurate. Accordingly, long time to manufacture the camera module is required.

SUMMARY

Therefore, the embodiment is to save time required to manufacture a camera module. To this end, the embodiment is to easily adjust the focal length in the camera module. In other words, the embodiment is to adjust the focal length without disassembling the camera module.

According to the embodiment, there is provided a camera module including a lens barrel including a lens, a lens holder coupled with the lens barrel, and a sensor unit in the lens holder. The lens holder includes a body part including the sensor unit, and a focal length adjusting unit to adjust a focal length between the lens and the sensor unit.

According to the camera module of the embodiment, the focal length adjusting unit may be rotatably coupled with the body part.

In addition, according to the camera module of the embodiment, the body part may include a first step difference part formed in opposition to the focal length adjusting unit, and the focal length adjusting unit may include a second step difference part in opposition to the body part such that the second step difference part is engaged with the first step difference part.

According to the camera module of the embodiment, the first step difference part may include a plurality of first coupling surfaces partitioned according to step differences therebetween and arranged in a step structure, and the second step difference part may include a plurality of second coupling surfaces arranged in a shape corresponding to a shape of the first step difference part.

According to the camera module of the embodiment, at least one of the first coupling surfaces may be coupled with at least one of the second coupling surfaces as the focal length adjusting unit rotates corresponding to the body part such that the focal length is adjusted.

According to the camera module of the embodiment, the body part may include a first coupling surface formed in opposition to the focal length adjusting unit and inclined from an axis to connect a center of the lens with a center of the sensor unit, and the focal length adjusting unit may include a second coupling surface formed in opposition to the body part and arranged in a shape corresponding to a shape of the first coupling surface such that the second coupling surface is engaged with the first coupling surface.

In addition, according to the camera module of the embodiment, at least a portion of the first coupling surface may be coupled with at least a portion of the second coupling surface as the focal length adjusting unit rotates corresponding to the body part such that the focal length is adjusted.

As described above, according to the camera module of the embodiment, the focal length can be easily adjusted. In other words, the lens holder is divided into the body part and the focal length adjusting unit, and the focal length adjusting unit is configured movably from the body part. Accordingly, the distance between the lens assembly and the sensor unit can be adjusted without disassembling the camera module. Therefore, the time to manufacture the camera module can be saved.

BRIEF DESCRIPTION OF THE DRAWINGS

FIG. 3 shows views to explain the operation of a lens barrel of FIG. 1.

FIG. 5 shows views to explain the modification of a lens holder in the camera module according to one embodiment and the operation thereof.

FIG. 6 is an exploded perspective view showing a camera module according to another embodiment.

DETAILED DESCRIPTION OF THE EMBODIMENTS

Figure 1:
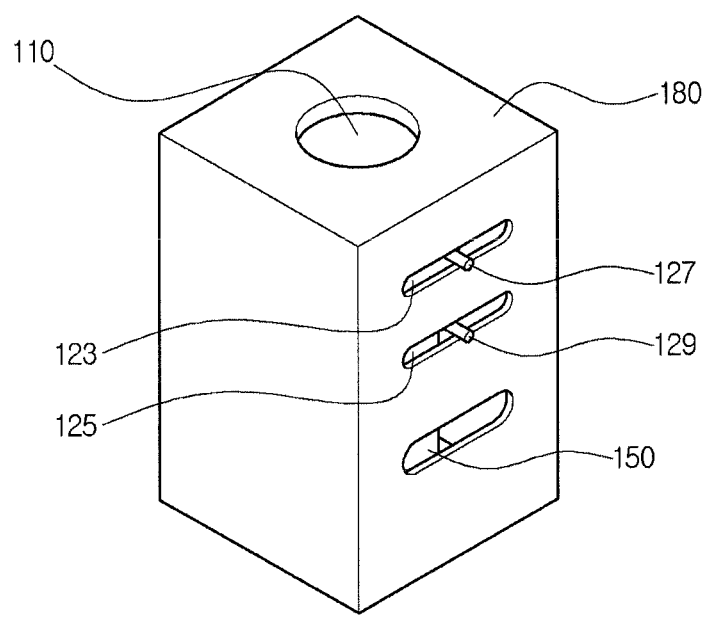
FIG. 1 is a perspective view showing a camera module according to one embodiment.

Hereinafter, the embodiments will be described in more detail with reference to accompanying drawings. In the following description, for the illustrative purpose, the same components will be assigned with the same reference numerals. If it is determined that description about well known functions or configurations may make the subject matter of the embodiments unclear, the details thereof will be omitted.

In the following description of the embodiments, it will be understood that, when a lens, a unit, a part, a hole, a protrusion, a groove, or a layer is referred to as being "on" or "under" another lens, another unit, another part, another hole, another protrusion, another groove, or another layer, it can be "directly" or "indirectly" on the other lens, the other unit, the other part, the other hole, the other protrusion, the other groove, or the other layer, or one or more intervening layers may also be present. Such a position of each component has been described with reference to the drawings.

Figure 2:
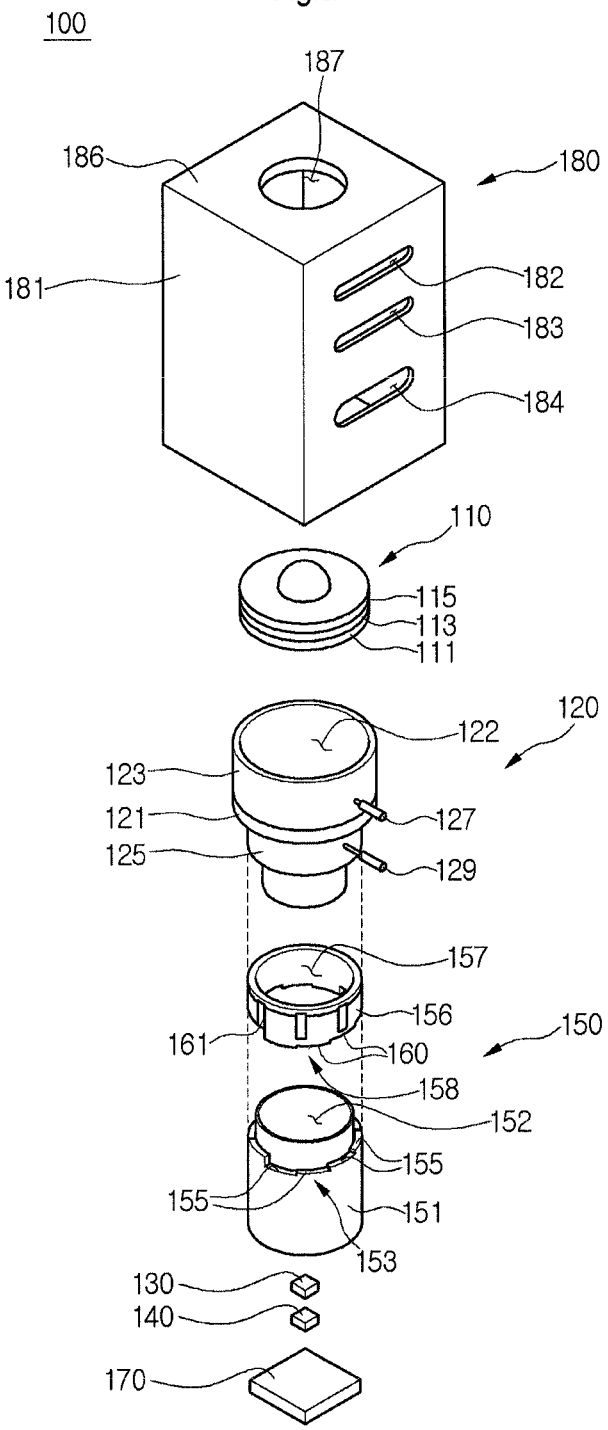
FIG. 2 is an exploded perspective view showing the camera module of FIG. 1.
Figure 4:
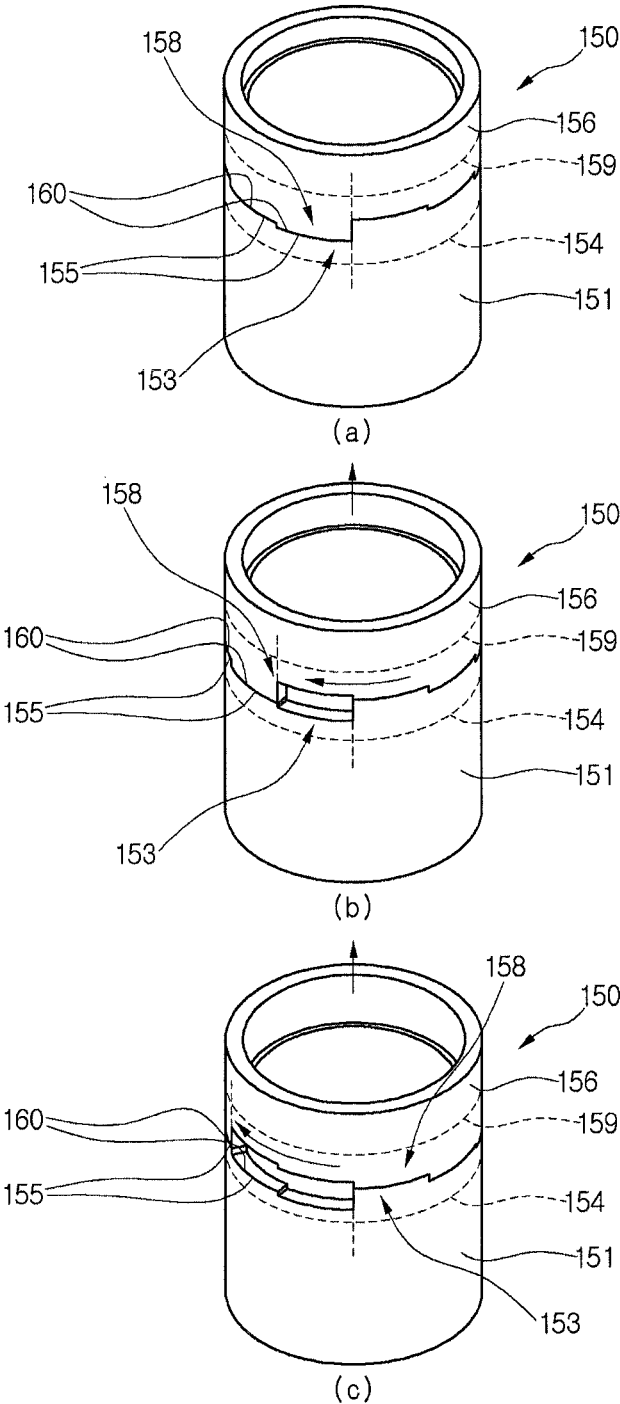
FIG. 4 shows views to explain the operation of a lens holder of FIG. 1.

FIG. 1 is a perspective view showing a camera module according to one embodiment. FIG. 2 is an exploded perspective view showing the camera module of FIG. 1. FIG. 3 shows views to explain the operation of a lens barrel of FIG. 1. FIG. 4 shows views to explain the operation of a lens holder of FIG. 1.

Referring to FIGS. 1 and 2, a camera module 100 according to the present embodiment includes a lens assembly 110, a lens barrel 120, a filter unit 130, a sensor unit 140, a lens holder 150, a circuit board 170, and a housing 180.

The lens assembly 110 includes at least one of lenses 111, 113, and 115. In this case, if the lens assembly 110 includes the lens 111, 113, and 115, the lenses 111, 113, and 115 are stacked in one direction. In this case, spacers (not shown) may be interposed among lenses 111, 113, and 115. The spacers spaces the lenses 111, 113, and 115 apart from each other so that the lenses 111, 113, and 115 are maintained at a predetermined interval. Further, the lens assembly 110 may have a circular outer shape. Alternatively, the lens assembly 110 may have a square outer shape.

The lens barrel 120 receives the lens assembly 110 therein. The lens barrel 120 receives the lens assembly 110 in one direction. In addition, the lens barrel 120 exposes the lens assembly 110. In other words, the lens barrel 120 exposes the lens assembly 110 so that light is incident onto the lens assembly 110. The lens barrel 120 includes a fixing barrel 121, a first rotational barrel 123, a second rotational barrel 125, a first adjusting lever 127, and a second adjusting lever 129.

The fixing barrel 121 receives the lens assembly 110 therein. In other words, the fixing barrel 121 has a structure in which a receiving hole 122 is formed, and the lens assembly 110 is received in the receiving hole 122. In this case, the receiving hole 122 may have the shape corresponding to the shape of the lens assembly 110. In this case, the receiving hole 122 may have a circular shape. Alternatively, the receiving hole 122 may have a polygonal shape. In addition, the fixing barrel 121 exposes the lens assembly 110.

The first rotational barrel 123 is coupled with the fixing barrel 121. In this case, the first rotational barrel 123 is coupled with a front end portion of the fixing barrel 121. In addition, the first rotational barrel 123 is rotatably coupled with the fixing barrel 121. Further, the first rotational barrel 123 surrounds the fixing barrel 121. Therefore, the first rotational barrel 123 may rotate corresponding to the fixing barrel 121 about an axis extending in one direction. In this case, first rotation graduations may be formed along an outer surface of the first rotational barrel to represent the rotational degree of the first rotational barrel 123.

The second rotational barrel 125 is coupled with the fixing barrel 121. In this case, the second rotational barrel 125 is coupled with the fixing barrel 121 under the first rotational barrel 123. In addition, the second rotational barrel 125 is rotatably coupled with the fixing barrel 121. Further, the second rotational barrel 125 surrounds the fixing barrel 121. Therefore, the second rotational barrel 125 may rotate corresponding to the fixing barrel 121 about an axis extending in one direction. In this case, second rotation graduations may be formed along an outer surface of the second rotational barrel 125 to represent the rotational degree of the second rotational barrel 125.

The first adjusting lever 127 is mounted on the side portion of the first rotational barrel 123. In this case, the first adjusting lever 127 is fixed to the first rotational barrel 123. In addition, the first adjusting lever 127 protrudes from the first rotational barrel 123. In this case, the first adjusting lever 127 protrudes in another direction perpendicular to the one direction. Accordingly, the first adjusting lever 127 rotates integrally with the first rotational barrel 123 corresponding to the fixing barrel 121.

The second adjusting lever 129 is mounted on the side portion of the second rotational barrel 125. In this case, the second adjusting lever 129 is fixed to the second rotational barrel 125. In addition, the second adjusting lever 129 protrudes from the second rotational barrel 125. In this case, the second adjusting lever 129 protrudes in another direction perpendicular to the one direction. Accordingly, the second adjusting lever 129 rotates integrally with the second rotational barrel 125 corresponding to the fixing barrel 121.

In other words, as the first adjusting lever 127 moves, rotational force is applied to the first rotational barrel 123. Accordingly, the first rotational barrel 123 may rotate corresponding to the fixing barrel 121. Therefore, the focus of the camera module 100 may be adjusted. In addition, the fixing barrel 121 may move the lens assembly 110 in the receiving hole 122 corresponding to the rotation of the first rotational barrel 123. Accordingly, the focus of the camera module can be adjusted. In this case, the focus of the camera module 100 can be adjusted to a long distance or a short distance.

The lens assembly 110 may move in the fixing barrel 121. In other words, as the first rotational barrel 123 rotates, the lens assembly 110 may move in the receiving hole 122. In this case, the lens assembly 110 may move in one direction. For example, as shown in FIG. 3(a), when the first adjusting lever 127 is located at the left side, the lens assembly 110 may be located at an inner upper portion of the lens barrel 120. As shown in FIG. 3(b), when the first adjusting lever 127 moves right, the lens assembly 110 may move down in the receiving hole 122.

Meanwhile, as the second adjusting lever 129 moves, rotational force is applied to the second rotational barrel 125. Accordingly, the second rotational barrel 125 may rotate corresponding to the fixing barrel 121. In addition, the fixing barrel 121 may adjust the exposed degree of the lens assembly 110 in the receiving hole 122 corresponding to the rotation of the second rotational barrel 125. Accordingly, the zoom range of the camera module 100 may be adjusted. In this case, the zoom range of the camera module 100 may be expanded or narrowed.

The filter unit 130 is provided under the lens barrel 120. The filter unit 130 filters the light incident thereon from the lens assembly 110. In this case, the filter unit 130 may cut off infrared light. In other words, the filter unit 130 may cut off light having a long wavelength. In addition, the filter unit 130 may be formed by alternately depositing titanium oxide and silicon oxide on optical glass. In this case, the optical characteristic of the filter unit 130 to cut off the infrared light may be adjusted according to the thicknesses of titanium oxide and silicon oxide.

The sensor unit 140 is provided under the filter unit 130. The sensor unit 140 converts the light incident thereon from the filter unit 130 into electrical image signals. In this case, the sensor unit 140 includes a CCD (charge coupled device) or a CMOS (complementary metal-oxide semiconductor).

The lens holder 150 is provided under the lens barrel 120. In addition, the lens holder 150 is coupled with the lens barrel 120. In this case, the lens holder 150 is coupled with the fixing barrel 121 of the lens barrel 120. The lens holder 150 is coupled with the fixing barrel 121 in one direction. In addition, the lens holder 150 is coupled with a distal end of the fixing barrel 121 under the second rotational barrel 125. The lens holder 150 includes a body part 151 and a focal length adjusting unit 156.

The body part 151 receives the filter unit 130 and the sensor unit 140. In other words, the body part 151 has a structure in which a first through hole 152 is formed, and the filter unit 130 and the sensor unit 140 are received in the first through hole 152. In this case, the body part 151 receives the filter unit 130 and the sensor unit 140 in one direction. In addition, the body part 151 exposes the filter unit 130 in opposition to the lens assembly 110. In other words, the body part 151 exposes the filter unit 130 so that light is incident onto the filter unit 130 and the sensor unit 140 from the lens assembly 110. In this case, the first through hole 152 may have the shape corresponding to that of the lens assembly 110. In this case, the first through hole 152 may have a cylindrical shape. In addition, the first through hole 152 may have a polygonal shape.

The body part 151 has a first step difference part 153 formed in opposition to the lens barrel 120. The first step difference part 153 includes a plurality of first coupling regions 154. In this case, the first coupling regions 154 have mutually the same structure. In other words, the first step difference part 153 is constructed by repeating the first coupling regions 154. In this case, the first coupling regions 154 may be provided in multiples of 3.

Each of the first coupling region 154 includes a plurality of first coupling surfaces 155. In this case, the first coupling surfaces 155 are partitioned by the step difference therebetween. The first coupling surfaces 155 are provided in a step structure. In this case, the first coupling surfaces 155 may be partitioned by at least three steps. In other words, the first coupling surfaces 155 may include at least four parts. Further, the step differences include 0.1 mm, 0.2 mm, 0.3 mm and 0.4 mm. For example, the first and second surfaces among the first coupling surfaces 155 may have the step difference of 0.1 mm therebetween, and the second and third surfaces among the first coupling surfaces 155 may have the step difference of 0.1 mm therebetween. Accordingly, the first and third surfaces among the first coupling surfaces 155 may have the step difference of 0.2 mm therebetween. In addition, the first coupling surfaces 155 may be connected with each other while forming a right angle therebetween. In addition, although not shown, the first coupling surfaces 155 may be connected with each other while forming a round shape therebetween.

The focal length adjusting unit 156 is interposed between the lens barrel 120 and the body part 151. In addition, the focal length adjusting unit 156 has a structure in which a second through hole 157 is formed, and the incident path of light from the lens assembly 110 to the filter unit 130 and the sensor unit 140 is provided through the second through hole 157. In addition, the focal length adjusting unit 156 is coupled with the lens barrel 120. In this case, the focal length adjusting unit 156 is fixed to the lens barrel 120. Further, the focal length adjusting unit 156 is coupled with the body part 151. In this case, the focal length adjusting unit 156 is rotatably coupled with the body part 151. The focal length adjusting unit 156 may surround the front end portion of the body part 151. Accordingly, the focal length adjusting unit 156 may rotate about the axis extending in one direction corresponding to the body part 151.

The focal length adjusting unit 156 has a second step difference part 158 formed in opposition to the body part 151. In this case, the second step difference part 158 is formed corresponding to the first step difference part 153 and engaged with the first step difference part 153. The second step difference part 158 includes a plurality of second coupling regions 159. In this case, the second coupling regions 159 mutually have the same structure. In addition, the second coupling regions 159 have a structure corresponding to that of the first coupling regions 154. In other words, the second step difference part 158 is constructed by repeating the second coupling regions 159. The second coupling regions 159 are provided in multiples of 3.

Each of the second coupling regions 159 includes a plurality of second coupling surfaces 160. In this case, the second coupling surfaces 160 are partitioned by the step difference therebetween. The second coupling surfaces 160 are provided in a step structure. In this case, the second coupling surfaces 160 may be partitioned by at least three steps. In other words, the second coupling surfaces 160 may include at least four parts. Further, step differences include 0.1 mm, 0.2 mm, 0.3 mm and 0.4 mm. For example, the first and second surfaces among the second coupling surfaces 160 may have the step difference of 0.1 mm therebetween, and the second and third surfaces among the second coupling surfaces 160 may have the step difference of 0.1 mm therebetween. Accordingly, the first and third surfaces among the second coupling surfaces 160 may have the step difference of 0.2 mm therebetween. In addition, the second coupling surfaces 160 may be connected with each other while forming a right angle therebetween. In addition, although not shown, the second coupling surfaces 160 may be connected with each other while forming a round shape therebetween.

In addition, the focal length adjusting unit 156 may further include adjusting grooves 161 formed along an outer surface of the focal length adjusting unit 156. In this case, the adjusting grooves 161 may be distributed in another direction perpendicular to one direction. In this case, the adjusting grooves 161 may be distributed at equal intervals. Accordingly, the adjusting grooves 161 may rotate integrally with the focal length adjusting unit 156 corresponding to the body part 151. Further, the focal length adjusting unit 156 may additionally have dial graduations formed along the outer surface thereof to represent the rotational degree of the focal length adjusting unit 156.

The focal length adjusting unit 156 may rotate corresponding to the body part 151. In this case, the rotational force may be applied to the focal length adjusting unit 156 through one of the adjusting grooves 161. In this case, at least one of the first coupling surfaces 155 may be coupled with at least one of the second coupling surfaces 160. Accordingly, the focal length adjusting unit 156 may move from the body part 151. In this case, the focal length adjusting unit 156 may move in one direction. In addition, the focal length adjusting unit 156 may move by the distance corresponding to the step difference between the first coupling surf aces 155 and the step difference between the second coupling surfaces 160.

For example, as shown in FIG. 4(*a*), all first coupling surfaces 155 may make contact with all second coupling surfaces 160. In addition, as shown in FIG. 4(*b*), as the focal length adjusting unit 156 rotates corresponding to the body part 151, remaining surfaces excluding the first surface from among the first coupling surfaces 155 may make contact with remaining surfaces excluding the first surface from among the second coupling surfaces 160. In this case, the focal length adjusting unit 156 may move from the body part 151 by the distance corresponding to the step difference between the first and second surfaces among the first coupling surfaces 155 or the step difference between the first and second surfaces among the second coupling surfaces 160. In addition, as shown in FIG. 4(*c*), as the focal length adjusting unit 156 rotates corresponding to the body part 151, remaining surfaces excluding the first and second surfaces from among the first coupling surfaces 155 may make contact with remaining surfaces excluding the first and second surfaces from among the second coupling surfaces 160. In this case, the focal length adjusting unit 156 may move from the body part 151 by the distance corresponding to the step difference between the first and third surfaces among the first coupling surfaces 155 or the step difference between the first and third surfaces among the second coupling surfaces 160.

Therefore, the focal length of the camera module 100 may be adjusted. In this case, the focal length of the camera module 100 represents a linear distance to connect the center of the lens assembly 110 with the center of the sensor unit 140. In this case, as the focal length adjusting unit 156 moves from the body part 151, the lens barrel 120 may move from the body part 151. Accordingly, the lens assembly 110 may moved from the sensor unit 140. In other words, the focal length between the lens assembly 110 and the sensor unit 140 may be adjusted. In this case, the focal length between the lens assembly 110 and the sensor unit 140 may be adjusted to the extent corresponding to the movement distance of the focal length adjusting unit 156 from the body part 151.

The circuit substrate 170 is provided under the lens holder 150. In addition, the sensor unit 140 is mounted on the circuit substrate 170. In this case, the circuit substrate 170 is electrically connected with the sensor unit 140. In addition, the circuit substrate 170 fixes the sensor unit 140 thereon. In this case, the circuit substrate 170 may include a PCB (printed circuit board).

The housing 180 receives the lens barrel 120, the filter unit 130, the sensor unit 140, the lens holder 150 and the circuit substrate 170. In addition, the lens holder 150 and the circuit substrate 170 are installed in the housing 180. In this case, the housing 180 fixes the lens holder 150 and the circuit substrate 170. The housing 180 includes an outer portion 181 and a cover part 186.

The outer portion 181 surrounds the lens barrel 120, the lens holder 150 and the circuit substrate 170. In this case, the outer portion 181 may have a cylindrical shape. Alternately, the outer portion 181 may have a polygonal shape. In addition, the outer portion 181 may include plastic or metal.

In this case, the outer portion 181 is provided therein with a first guide hole 181 to expose the first adjusting lever 127 from the lens barrel 120 and guide the movement path of the first adjusting lever 137. In addition, the outer portion 181 is provided therein with a second guide hole 183 to expose the second adjusting lever 120 from the lens barrel 120 and guide the movement path of the second adjusting lever 129. In this case, the first guide hole 181 and the second guide hole 183 may be formed separately from each other or integrally with each other. In addition, the outer portion 181 is formed therein with an exposing hole 184 to expose the lateral side of the focal length adjusting unit 156 from the lens holder 150. The exposing hole 184 may be formed separately from the first guide hole 182 and the second guide hole 183, and may be formed integrally with at least one of the first guide hole 182 and the second guide hole 183.

The cover part 186 covers the upper portion of the lens barrel 120. In this case, the cover part 186 may have an outer appearance corresponding to the outer portion 181. In other words, the cover part 186 may have a circular outer appearance. Alternately, the cover part 186 may have a polygonal outer appearance. In addition, the cover part 186 may include plastic or metal.

The cover part 186 is provided therein with a light incidence hole 187 to expose the lens assembly 110. The light incidence hole 187 may be formed at the central portion of the cover part 186. In addition, light is incident to the lens assembly 110 from the cover part 186 through the light incidence hole 187.

Meanwhile, although an example that the adjusting grooves 161 are formed in the focal length adjusting unit 156 is disclosed according to the present embodiment, the embodiment is not limited thereto. In other words, even if the adjusting grooves 161 are not formed in the focal length adjusting unit 156, the disclosure can be realized. For example, the lens holder 150 may further include a dial lever (not shown). The dial lever may be mounted on the side portion of the focal length adjusting unit 156. In this case, the dial lever may be fixed to the focal length adjusting unit 156. The dial lever may protrude from the focal length adjusting unit 156. In this case, the dial lever may protrude in another direction perpendicular to one direction. Therefore, the dial lever may rotate integrally with the focal length adjusting unit 156 corresponding to the body part 151.

In other words, as the dial lever moves, the rotational force may be applied to the focal length adjusting unit 156. Accordingly, the focal length adjusting unit 156 may rotate corresponding to the body part 151. In this case, at least one of the first coupling surfaces 155 may be coupled with at least one of the second coupling surfaces 160. Therefore, the focal length adjusting unit 156 may move from the body part 151. In this case, the focal length adjusting unit 156 may move in one direction. In addition, the focal length adjusting unit 156 may move by the distance corresponding to the step difference between the first coupling surfaces 155 or the step difference between the second coupling surfaces 160.

Therefore, the focal length of the camera module 100 may be adjusted. In this case, as the focal length adjusting unit 156 moves from the body part 151, the lens barrel 120 may move from the body part 151. Accordingly, the lens assembly 110 may move from the sensor unit 140. In other words, the focal length between the lens assembly 110 and the sensor unit 140 may be adjusted. In this case, the focal length between the lens assembly 110 and the sensor unit 140 may be adjusted to the extent corresponding to the movement distance of the focal length adjusting unit 156 from the body part 151.

FIG. 5 shows views to explain the modification of the lens holder in the camera module according to one embodiment and the operation thereof.

Referring to FIG. 5, a first inclined part 153' is formed in the body part 151 of the lens holder 150 in opposition to the lens barrel 120. The first inclined part 153' includes a plurality of first coupling regions 154'. In this case, the first coupling regions 154' mutually have the same structure. In other words, the first inclined part 153' is constructed by repeating the first coupling regions 154'. In this case, the first coupling regions 154' may be provided in multiples of three.

In addition, each of the first coupling regions 154' includes a first coupling surface 155'. In this case, each of the first coupling regions 154' may include one first coupling surface 155'. In this case, the first coupling surface 155' is inclined from an axis to connect the center of the lens assembly 110 and the center of the sensor unit 140. In addition, the first coupling surface 155' may be a non-curved surface. In addition, although not shown, the first coupling surface 155' may be a curved surface.

Meanwhile, a second inclined part 158' is formed in the focal length adjusting unit 156 of the lens holder 150 in opposition to the body part 151. In this case, the second inclined part 158' is formed corresponding to the first inclined part 153' and engaged with the first inclined part 153'. The second inclined part 158' includes a plurality of second coupling regions 159'. In this case, the second coupling regions 159' mutually have the same structure. In addition, the second coupling regions 159' have the structure corresponding to that of the first coupling regions 154'. In other words, the second inclined part 158' is constructed by repeating the second coupling regions 159'. In this case, the second coupling regions 159' may be provided in multiples of three.

In addition, each of the second coupling regions 159' includes a second coupling surface 160'. In this case, the second coupling region 159' may include one second coupling surface 160'. In this case, the second coupling surface 160' is inclined from the axis to connect the center of the lens assembly 110 and the center of the sensor unit 140. In addition, the second coupling surface 160' may be a non-curved surface. In addition, although not shown, the second coupling surface 160' may be a curved surface.

In other words, the focal length adjusting unit 156 may rotate corresponding to the body part 151. In this case, rotational force may be applied to the focal length adjusting unit 156 through one of the adjusting grooves 161. In this case, at least a portion of the first coupling surface 155' may be coupled with at least a portion of the second coupling surface 160'. Accordingly, the focal length adjusting unit 156 may move from the body part 151. The focal length adjusting unit 156 may move in one direction. In addition, the focal length adjusting unit 156 may move from the body part 151.

For example, as shown in FIG. 5(a), the entire portion of the first coupling surface 155' may make contact with the entire portion of the second coupling surface 160'. In addition, as shown in FIG. 5(b), as the focal length adjusting unit 156 rotates corresponding to the body part 151, a portion of the first coupling surface 155' may make contact with a portion of the second coupling surface 160'. In this case, the focal length adjusting unit 156 may move from the body part 151.

Therefore, the focal length of the camera module 100 may be adjusted. In this case, the focal length of the camera module 100 represents a linear distance to connect the center of the lens assembly 110 with the center of the sensor unit 140. In this case, as the focal length adjusting unit 156 moves from the body part 151, the lens barrel 120 may move from the body part 151. Accordingly, the lens assembly 110 may moved from the sensor unit 140. In other words, the focal length between the lens assembly 110 and the sensor unit 140 may be adjusted. In this case, the focal length between the lens assembly 110 and the sensor unit 140 may be adjusted to the extent corresponding to the movement distance of the focal length adjusting unit 156 from the body part 151.

FIG. 6 is an exploded perspective view showing a camera module according to another embodiment.

Referring to FIG. 6, a camera module 200 according to the present embodiment includes a lens assembly 210, a lens barrel 220, a filter unit 230, a sensor unit 240, a lens holder 250, a circuit substrate 270, and a housing 280. In addition, the lens holder 250 includes a body part 251 and a focal length adjusting unit 256. In this case, since each component of the camera module according to the present embodiment is similar to that of the camera module of the previous embodiment, the details thereof will be omitted. However, the camera module 200 according to the present embodiment further includes at least one pad part 290.

The pad part 290 is interposed between the lens barrel 220 and the focal length adjusting unit 256. In addition, the pad part 290 has a structure in which a pass hole 291 is formed, and the incident path of light from the lens assembly 210 to the filter unit 230 and the sensor unit 240 is provided through the pass hole 291. In addition, the pad part 290 spaces the lens barrel 220 apart from the focal length adjusting unit 256. In this case, the pad part 290 has a predetermined thickness. In other words, the pad part 290 spaces the lens barrel 220 apart from the focal length adjusting unit 256 by a distance corresponding to the thickness. In this case, the thicknesses of the pad part 290 include 0.1 mm, 0.2 mm, 0.3 mm, and 0.4 mm.

Therefore, the focal length of the camera module 100 may be adjusted. In this case, as the focal length adjusting unit 256 moves from the body part 251, the lens barrel 220 may move from the body part 251 to adjust the focal length. In addition, as the pad part 290 is interposed between the lens barrel 220 and the focal length adjusting unit 256, the lens barrel 220 is spaced apart from the body part 251 to adjust the focal length. Accordingly, the lens assembly 210 may move from the sensor unit 240. In other words, the focal length between the lens assembly 210 and the sensor unit 240 may be adjusted.

According to the disclosure, the focal length of the cameral module 100 or 200 can be easily adjusted. In other words, the lens holder 150 or 250 is partitioned into the body part 151 or 251 and the focal length adjusting unit 156 or 256, and the focal length adjusting unit 156 or 256 is configured movably from the body part 151 or 251. Accordingly, the distance between the lens assembly 110 or 210 and the sensor unit 140 or 240 can be adjusted without disassembling the camera module 100 or 200. Accordingly, time required to manufacture the camera module 100 or 200 can be saved.

Although a preferred embodiment of the disclosure has been described for illustrative purposes, those skilled in the art will appreciate that various modifications, additions and substitutions are possible, without departing from the scope and spirit of the invention as disclosed in the accompanying claims.

What is claimed is:

1. A camera module comprising:
a lens barrel including a lens;
a lens holder coupled with the lens barrel; and
a sensor unit in the lens holder,
wherein the lens barrel comprises:
a fixing barrel;
a first rotational barrel rotatably coupled with a front end portion of the fixing barrel;
a second rotational barrel rotatably coupled with the fixing barrel under the first rotational barrel;
a first adjusting lever being mounted on a side portion of the first rotational barrel and protruding from the first rotational barrel, the first adjusting lever rotating integrally with the first rotational barrel corresponding to the fixing barrel; and
a second adjusting lever being mounted on a side portion of the second rotational barrel and protruding from the second rotational barrel, the second adjusting lever rotating integrally with the second rotational barrel corresponding to the fixing barrel,
wherein a focus of the camera module is adjusted when the first rotational barrel is rotated with respect to the fixing barrel,
wherein a zoom range of the camera module is adjusted when the second rotational barrel is rotated with respect to the fixing barrel,
wherein the lens holder comprises:
a body part including the sensor unit; and
a focal length adjusting unit interposed between the lens barrel and the body part and rotatably coupled with a front end portion of the body part,
wherein a focal length between the lens and the sensor unit is adjusted when the focal length adjusting unit is rotated to with respect to the body part, and
wherein the camera module further comprises a housing to receive the lens barrel, the lens holder, and the sensor unit and fix the body part thereto, the housing having an outer portion provided with a first guide hole and second guide hole, the first guide hole exposing the first adjusting lever and the second guide hole exposing the second adjusting lever.

2. The camera module of claim 1, wherein the body part comprises a first step difference part formed in opposition to the focal length adjusting unit, and the focal length adjusting unit comprises a second step difference part in opposition to the body part such that the second step difference part is engaged with the first step difference part.

3. The camera module of claim 2, wherein the first step difference part comprises a plurality of first coupling surfaces partitioned according to step differences therebetween and arranged in a step structure, and the second step difference part comprises a plurality of second coupling surfaces arranged in a shape corresponding to a shape of the first step difference part.

4. The camera module of claim 3, wherein the step difference is 0.1 mm.

5. The camera module of claim 3, wherein the first coupling surfaces are connected with each other while forming a right angle or a round shape therebetween, and
the second coupling surfaces are connected with each other while forming a right angle or a round shape therebetween.

6. The camera module of claim 3, wherein the first step difference part includes a plurality of first coupling regions, and each first coupling region has the first coupling surfaces, and
the second step difference part includes a plurality of second coupling regions having shapes corresponding to shapes of the first coupling regions, and each second coupling region has the second coupling surfaces.

7. The camera module of claim 3, wherein at least one of the first coupling surfaces is coupled with at least one of the second coupling surfaces as the focal length adjusting unit rotates with respect to the body part such that the focal length is adjusted.

8. The camera module of claim 1, wherein the body part comprises a first coupling surface formed in opposition to the focal length adjusting unit and inclined from an axis to connect a center of the lens with a center of the senor unit, and
the focal length adjusting unit comprises a second coupling surface formed in opposition to the body part and arranged in a shape corresponding to a shape of the first coupling surface such that the second coupling surface is engaged with the first coupling surface.

9. The camera module of claim 8, wherein the first coupling surface and the second coupling surface have curved surfaces or non-curved surfaces.

10. The camera module of claim 8, wherein the body part is provided by repeating a plurality of first coupling regions and each first coupling region has the first coupling surface, and
the focal length adjusting unit is provided by repeating a plurality of second coupling regions having shapes corresponding to shapes of the first coupling regions, and each second coupling region has the second coupling surface.

11. The camera module of claim 8, wherein at least a portion of the first coupling surface is coupled with at least a portion of the second coupling surface as the focal length adjusting unit rotates with respect to the body part such that the focal length is adjusted.

12. The camera module of claim 1, wherein the focal length adjusting unit is fixed to the lens barrel.

13. The camera module of claim 12, further comprising a pad part interposed between the lens barrel and the focal length adjusting unit to space the lens barrel apart from the focal length adjusting unit.

* * * * *